C. B. Hutchinson,
Jointing Staves.
N° 10,094.
Patented Oct. 4, 1853.
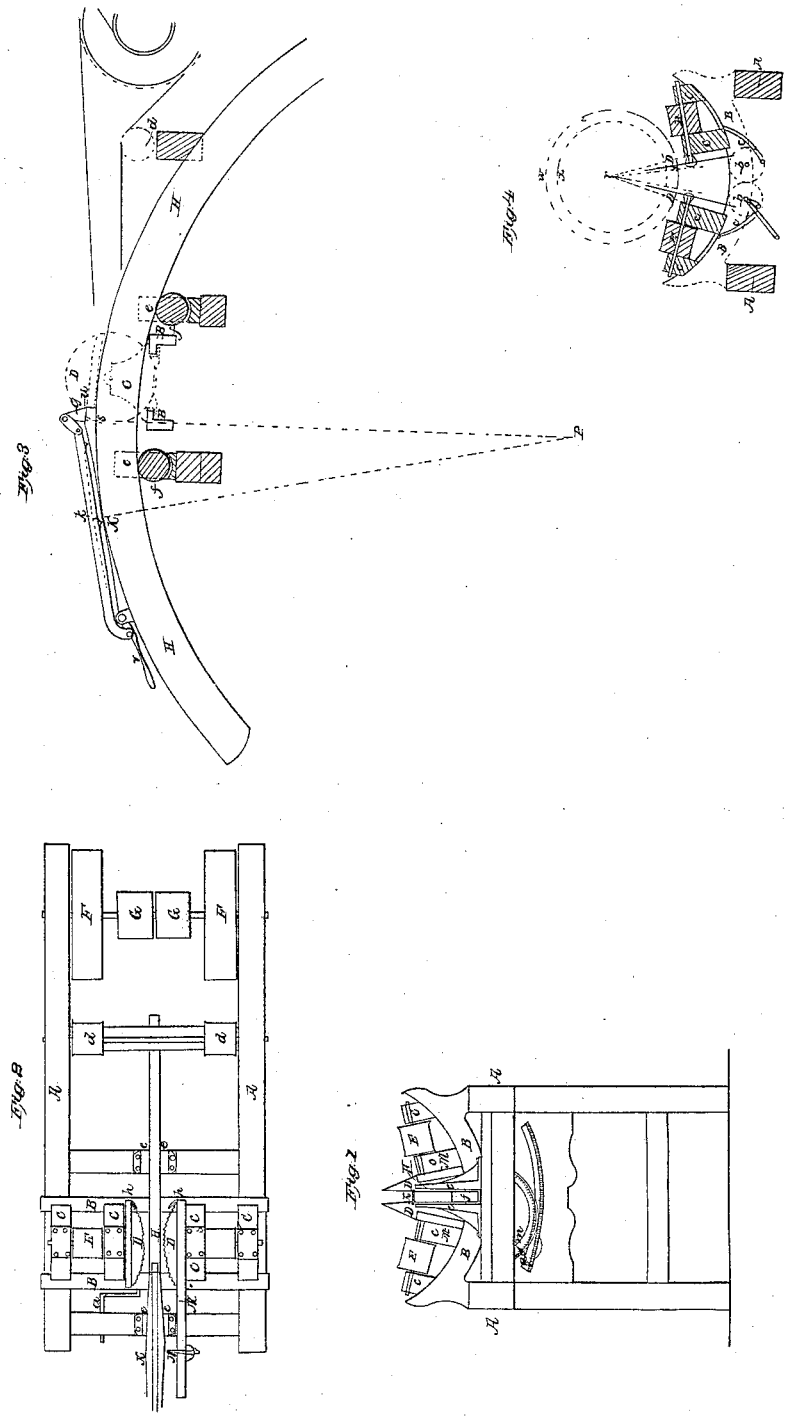

UNITED STATES PATENT OFFICE.

CHAS. B. HUTCHINSON, OF SYRACUSE, NEW YORK.

MACHINE FOR JOINTING STAVES.

Specification of Letters Patent No. 10,094, dated October 4, 1853.

*To all whom it may concern:*

Be it known that I, CHARLES B. HUTCHINSON, of Syracuse, in the county of Onondaga and State of New York, have invented a certain new and useful Improvement in Machines for Jointing Staves; and I do hereby declare that the following is a full, clear, and exact description of the construction and operation of the same, reference being had to the accompanying drawings, making a part hereof, in which—

Figure 1, is an end view, showing the saws and saw frame, without the central arch and bed plate, Fig. 2, is a plan, Fig. 3, is a longitudinal section through the middle, showing, in connection with Fig. 4, the central arch and bed plate, and their relation to the saws and saw frame. Fig. 4, is a cross section, through the middle of the saws and saw arbors; the same letters referring to like parts in each figure, and the dotted lines in the two last showing the relative position of parts on one side or the other of the plane of section, as lettered.

A, is the main frame, across one end of which are securely fastened the parallel circular arcs B, concave upward to support the ends of the double piers C, on the tops of which are mounted the arbors for the two saws D. The inner edges of the arcs B are turned to a true circle and form ways, fitting closely into corresponding circular grooves or projections in the bases of the piers C. The piers, with the saws, may be made to approach to or recede from one another through equal spaces along the circular ways B, by any suitable mechanical device; in the drawings, (Fig. 4); this is supposed to be done by means of the crank *a*, turning one of the equal toothed wheels *b*, which work into one another, and act equally on the opposite piers by means of the short cam rods *c*, jointed to them at their bases. The saws being once accurately adjusted in the direction of the radii of the circular arcs B, (as seen in Fig. 4) will of course point invariably to the same center, however the piers C may be moved. E are the pulleys on the said arbors, F the driving pulleys, G fast and loose pulleys by which motion is communicated to the whole, *d* friction pulleys, over which the lower part of the belts from the driving pulleys is carried, so that it may be kept in its place in any position of the pulleys E.

The stave to be jointed is carried endwise on a circle or other proper curve between the saws D; its carriage being the movable central arch H, which runs exactly midway between the saws D, being guided by the upright support *e*, over the small rollers *f*, and carries the bed plate K, on which the stave is placed. The bed-plate K is a little hollowed to receive the convex side of the stave, and is furnished with a lever L, which serves at once as a clamp to keep the stave in its place, and as a handle to move the carriage back and forth between the saws; it is parallel to the bed plate in all positions and has spurs projecting on the under side, and as its downward motion is also forward, carries the stave against the head piece *g* and holds it firmly down.

M are pieces fastened to the inner side of the piers nearest the saws, carrying at one end the guard *h*, and at the other, opposite the width of the bed plate K when drawn back, a small leaf or wing N, which overhangs it so far as to have its inner edge exactly in the plane of the saw. This moving with the saw, indicates the proper position of the stave on the bed plate, so as to be jointed with the least possible waste of material. It is hung at its outer edge on the small pin *l*, on which it turns freely, so as to yield, in case the rough stave should be wider at any point than in the middle.

*m*, (Fig. 1,) is an index, moving with the crank *a* or otherwise over a graduated arc and thus showing at once the width between the saws. The handle of the crank itself may serve as the index.

It will be seen that with the arrangement which has been described, the width between the saws can be varied at pleasure, without stopping their motion, even for every stave if necessary.

Having thus described the parts of the machine, and sufficiently indicated the manner of using it, I proceed to point out the principle on which it operates in giving to the stave the proper shape, and the manner in which it may be adapted to staves of different shapes.

It will be seen from Fig. 3, that if the under edge of the central arch H is a true circle, of which the point P is the center, then every part of the stave will move in a circular path, about P as a center of motion;

and while the middle of the stave, being nearest this center, moves in the circle K s, and meets the saws at the points s, t, (Fig. 4) the ends will move in the circle k n, and meet the saws higher up, at the point u, v. Consequently, the middle will be cut widest, or of the width s, t (Fig. 4) the ends narrowest, is of the width u r, and the intervening points of a width gradually diminishing from the middle to the ends, and of equal widths at equal distances from the middle on either side. And this is true, whatever the width of the stave, the middle still bearing a uniform proportion to the ends, to wit, the proportion of the radius r s to the radius r u, or of the circumference t s w to the circumference r u x (the staves thus jointed will therefore work into barrels of uniform shape, of which t s w will be the middle circumference, and r u x the end circumference, and the bevel of the edges will of course be correct, being always in the direction of the radii. In order therefore that staves may be correctly jointed for barrels of any required dimensions, it is only necessary that the ends of the staves in passing between the saws should rise higher then the middle by a difference u s equal to half the difference of the greatest and least diameters of the barrel. Now, the length of the stave remaining the same, the difference of height u s (Fig. 3) will depend on the curvature of the central arch that is on the distance of the point k from the center of motion, being greater as that is less and less as that is greater; which distance for any required difference of semi-diameters u s, may readily be determined either mechanically or arithmetically mechanically, by laying off in a straight line the length of the stave, (as in Fig. 3,) and from the middle point as K, in making the perpendicular K k equal to the required difference of semi-diameters u s; if then a circle be made to pass through the ends of the stave and of the perpendicular K k, the distance of its center from K will be the required distance. Or, divide the square of half the length of the stave by the required difference of diameters, and from the quotient subtract one fourth of that difference, the remainder will be the required distance K P: which in either case is to be laid off on a perpendicular to the horizon from the point s. Having fixed the point P, we describe from it the circle of the under side of the arch, and determine the position of the rollers f. For example, if staves thirty inches in length were to be worked into barrels 21 inches in diameter at the middle and 17½ at the ends, the distance K P would be $$\frac{225}{3\frac{1}{2}} - \frac{7}{8} = 63\frac{23}{56}$$

inches, and the same for any other diameter having a difference of 3½ inches. If the difference in diameter were three inches, K P would be $$\frac{225}{3} - \frac{3}{4} = 74\frac{1}{4}$$

inches; if 2¾ inches it would be 81⅓ very nearly; if 2½, 89⅜. As the central arch H may be made very cheaply of wood, by having several of different curvatures, fitted to receive the same bed plate K, and slightly raising or lowering as the case might require the rollers f, a single machine may be adapted to all the different sizes of barrels and half barrels in common use. And so also for the larger or smaller class of casks, as hogsheads, tierces and pipes on the one hand, and kegs on the other.

I have thus far assumed that the under edge of the central arch H is an arc of a circle; but this form may be varied, so as to give to the edge of the stave any required shape, other than that which the circular central arch would give. Portions of the arch may be made of a different curvature, or carried out in a straight line, or otherwise indefinitely varied.

From the figures which have been given, it will be seen that a variation of a quarter of an inch in the difference of semi-diameters r s, varies the radius of curvature K P by from 11 to 15 inches; whence it follows conversely that a slight variation in the latter, such as the added thickness of one or two staves will have hardly a perceptible effect upon the former, and will cause no appreciable disproportion in the widths of the staves. We may therefore joint two or more staves at a time, and increase proportionally the speed of performance. For this purpose the bedplate K should be lowered half or three-quarters of an inch, so that the top stave should be at the distance K P, in order that the slight difference of brace between the upper and lower stave should be in favor of tightness.

It is not material that I should specify all the forms in which I have contemplated the application of the principles embodied in my invention. There are many modes in which the endwise rotation between the saws may be obtained, which I suppose I could employ under the same claim, though I have described only the one which appears to me to combine the most advantages. One variation only I will mention which I consider of special importance. By substituting a complete circle, with or without an axle as P, and furnished with a sufficient number of bed plates, for the single arch piece H with its bedplate also a feed roller for the lever I, the staves may be fed in continuously, without any retraction, as fast as the saws will cut, and great additional speed obtained. The same object would be attained by using a series of arch pieces or bed plates, arranged in the form of an endless chain. And the construction for this purpose may be still further simplified, dispensing both with the complete circle and with the continuous series of segments of that circle, by taking one of those segments, as for instance, in Fig. 3, the shaded portion of the bed-plate K exterior to the line of the outer circumference K s, and winding it as it were, about a smaller circle of suitable size, so as to form an eccentric, in which the deviation from a true circle shall be equal to the required difference of height $u\ s$; which arrangement, in combination with a weighted feed-roller, would fulfil all the conditions of the problem, and may be considered as the mechanical equivalent of the principal method above described.

In all other modes of jointing, so far as I know, with a single exception, but one side of the stave is jointed at a time, and that with the same bilge, or difference between the middle and ends, whatever the width of the stave, instead of having the bilge exactly proportioned to the width. In setting up such staves, great care is requisite to use a proper proportion of wide and narrow staves, otherwise the barrels will be too flat, too bilging, open at the joints, one sided, or otherwise ill-shaped, and with no degree of care can barrels perfectly uniform in size and shape be produced; while staves may be jointed by my machine, with greater facility and speed, with mathematical accuracy, so that they can not fail to make perfectly uniform and symmetrical barrels however the widths of the staves may vary. The single exception to which I have referred, is where the staves are bent or sprung as near as may be to the curve they are to take in the barrel, and in this condition are carried on a level between saws so inclined as to give the bevel. My arrangement obviates the necessity of springing the stave, which in the case of thick or short staves is objectionable, not only as requiring some degree of force, but also because the staves vary in stiffness, and take unequal curvatures when sprung; and it enables me to produce perfect work, with greater facility, and from twice to four times as fast; and by means of the adjustable saws, I can take the staves as they come, of whatever width, and give each one its proper curvature, using up all the material with the least possible waste. To these advantages of my machine over others for the same purpose, may be added as a very important one, its easy and perfect adaptability, with equal success, to all kinds of work.

I am well aware that there is no novelty or difficulty in making saws for jointing staves adjustable by elevating, depressing, or retracting their arbors, or otherwise altering their position; yet I am aware of but one previous attempt to make them instantaneously adjustable without stopping their motion. I refer to the patent granted April 4th, 1848 to A. C. Currier and Abel Bradway, which I am advised and perceive covers a specific device for varying the width between the cutters, by securing them in bearings united to each other at a common center, in combination with another device therein described. Now my object is, not merely to vary the widths, but to keep the cutters, as they are moved for this purpose, pointing invariably to the constant center; an object which, if contemplated, is not named or alluded to in Currier and Bradway's specification. And the device which I employ is different, in that the piers or bearings are not united, but entirely separate, and either one may be detached and removed without disturbing the other, yet being fitted to and made to move along the circular guide-ways, toward the center of which the saws or cutters point, cannot fail to accomplish with entire accuracy, both the objects proposed. My arrangement for this purpose I therefore regard and claim as novel and practicable. As to the mode of presenting the stave to the action of the saws or cutters, it is obvious that, supposing them set as described, there is precisely one point at which each particular part of any given stave must meet them, in order to be correctly jointed. My mode of bringing each part of the stave to this precise point, is, by rotating it endwise, in a plane perpendicular to its width, on such a curve as to give to the several parts of the stave where they meet the saws the requisite differences of height, by means of the rotating central arch or its mechanical equivalent. This arrangement also I believe to be novel and patentable, regarding it as essentially different from the only other mode in which so far as I know the same thing has been attempted, viz, by cutting the stave while it is bent or sprung as near as may be to the curvature required. These are the leading features of my invention, yet I intend to claim also some of the particular devices employed in connection with the machine. To sum up the whole,

What I claim as my invention, and desire to secure by Letters Patent, are the following:

1. I claim the use of the circular guideways, in combination with the movable piers or bearings, and the cams or levers or other suitable means of moving the same simultaneously and equally along said circular guideways, so that the saws or other cutters may be instantaneously adjusted for any required width of stave without stopping their motion or changing their direction toward a constant central point.

2. I claim the use of the wing or leaf gage N, in combination with the index moving over a graduated arc or dial, both moving in connection with the saws, so as to indicate at a glance the width between the saws, and to guide the operator in setting the stave on its bed plate and in adjusting the saws.

3. I claim the mode of jointing staves to any required bilge and bevel, without bending or springing them, by rotating them endwise, in a plane perpendicular to their width, between saws or other cutters so inclined as to give the correct bevel, whether adjustable as above or not; said rotation being upon a circle or other proper curve, such as to present each part of the stave to the action of the inclined cutters at the precise point or height requisite to give it its exact proportionate width or bilge; the rotation being obtained by means of a central arch piece moving over rollers about a constant center of motion, substantially as described, or by other equivalent means.

C. B. HUTCHINSON. [L. S.]

Witnesses:
E. T. BURT,
I. HURST.